Sept. 4, 1951  F. V. TOOLEY  2,566,643
METHOD AND APPARATUS FOR FORMING FIBERS
Filed Sept. 21, 1945  2 Sheets-Sheet 1
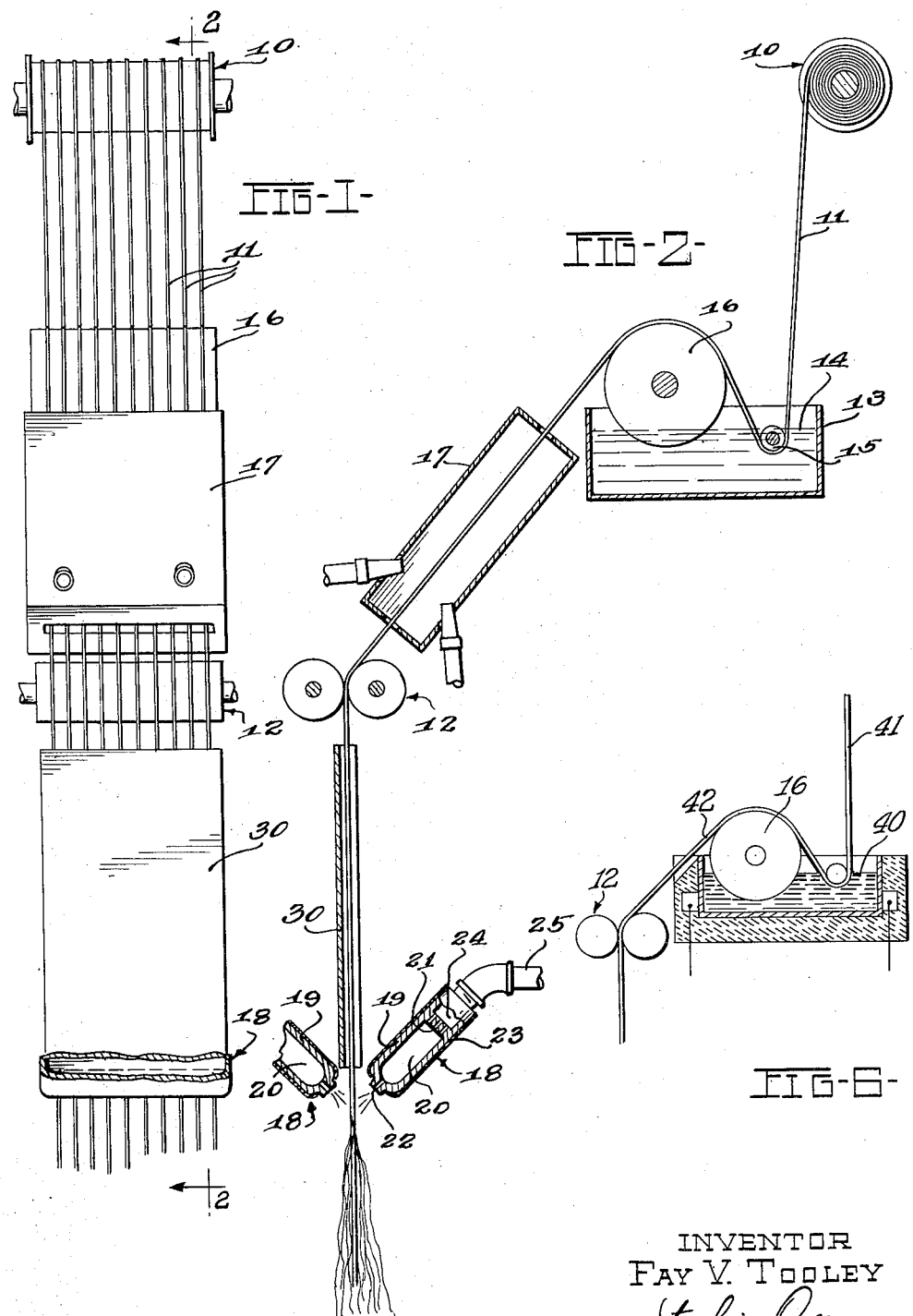
INVENTOR
FAY V. TOOLEY
BY
ATTYS Sept. 4, 1951 F. V. TOOLEY 2,566,643
METHOD AND APPARATUS FOR FORMING FIBERS
Filed Sept. 21, 1945 2 Sheets-Sheet 2
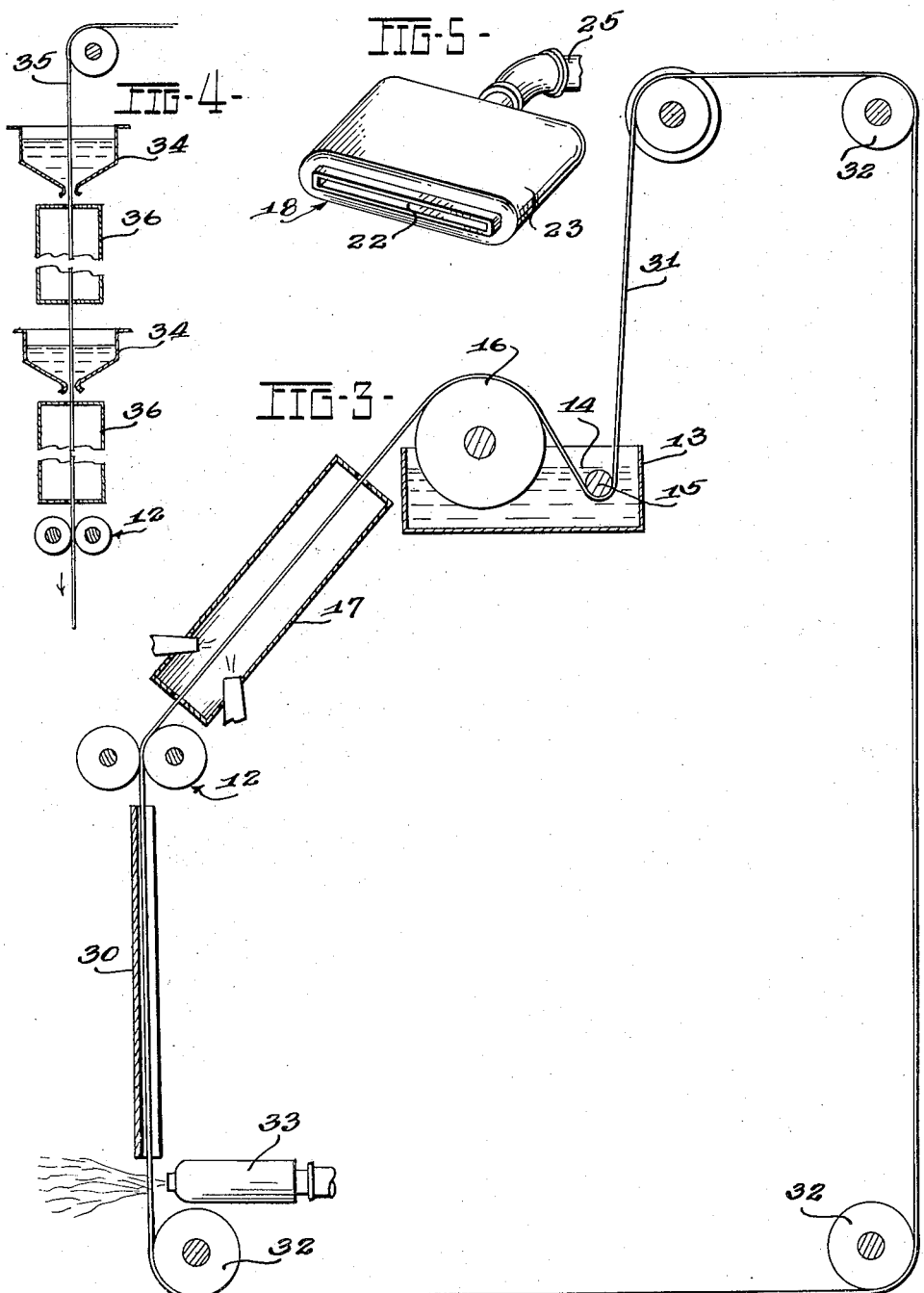
INVENTOR
FAY V. TOOLEY
BY Stachu & Overman
ATTYS.

Patented Sept. 4, 1951

2,566,643

UNITED STATES PATENT OFFICE 2,566,643

METHOD AND APPARATUS FOR FORMING FIBERS

Fay V. Tooley, Newark, Ohio, assignor to Owens-Corning Fiberglas Corporation, a corporation of Delaware Application September 21, 1945, Serial No. 617,862

13 Claims. (Cl. 18—2.5)

The present invention relates generally to the manufacture of fibers from heat softenable material, such for example, as glass or from thermoplastic materials having characteristics similar to glass.

One of the principal objects of this invention is to provide a method and apparatus rendering it possible to produce glass or other fibers directly from a batch of glass-forming material. As a result, the production rate of thermoplastic fibers is greatly increased and the cost of manufacture is substantially reduced.

In accordance with the present invention, the glass batch from which the fibers are to be formed is deposited on a carrier while in a raw or moist and unformed state. The material is then dried and the carrier with the material thereon is introduced to a high velocity gaseous blast which not only is heated to a temperature sufficient to soften the material, but has a velocity sufficient to attenuate the material into fibers. The temperature of the blast and the velocity of the latter is so great that the dried batch material is reduced by the blast to extremely fine fibers. Such fibers are ideally suited for the production of sewing thread, for reinforcement for plastics and other material, for fine textiles, for highly resilient webs, mats and blankets, for thermal and acoustical insulation, and for many other purposes where fine fibers are desired.

It has been found that very small integral rods of batch materials from which fine fibers are to be made sometimes break off remote from the point of attenuation when engaged by the high velocity blast and pressure. This objection may be overcome by forming the batch material around a core member which may be formed of either a combustible or a non-combustible material and may be accomplished in a substantially continuous manner.

It is another object of the invention to provide a reinforced rod of batch material, which is capable of withstanding the pressure of an attenuating flame as glass fibers are formed therefrom.

Another object of this invention is to deposit the fiber forming material in a raw state on threads of combustible material such, for example, as string, cord, loosely braided sleeving or continuous glass filaments. In the event string or threads of similar combustible material are employed as a carrier for the glass coating, the temperature of the blast is sufficiently high to instantaneously burn the carrier as it comes in contact with the blast and the remaining glass is softened sufficiently by the heat generated in the blast to enable the latter to attenuate the softened glass into extremely fine fibers. The amount of organic material from which the carrier is formed is relatively small in relation to the volume of fibers produced from the batch carried thereby and the residue resulting from the burning out of the carrier does not materially affect the quality of the fiber product. On the other hand, if a continuous glass filament is employed as a carrier for the glass coatings, the filament is softened with the glass coatings by the heat generated in the blast and the resulting mass is attenuated into fibers by the high velocity blast.

Still another object of this invention is to support burners at opposite sides of the path of travel of the carrier in positions to discharge blasts toward the carrier in the general direction of advancement of the carrier. As a result, the blasts from the two burners cooperate to apply a propelling force on the softened glass sufficient to draw out the glass to substantial lengths and thereby produce fine fibers.

Still another object of the invention is to provide a high temperature resistant wire which may be of endless construction as a carrier for the glass batch material from which fibers are formed.

A further object of this invention is to provide a carrier comprising a continuous length of high temperature resistant wire wettable by molten glass and which may be passed through a body of molten glass and coated thereby. As the glass coated wire enters the extremely hot, high velocity blast, the glass on the wire is softened and is blown off the wire in the form of fibers.

A still further feature of this invention is to deposit several coatings of glass batch on the carrier by advancing the latter through a plurality of spaced batches of glass having a consistency such that it adheres to the carrier as it passes therethrough and by drying the glass coatings during the intervals the carrier passes between adjacent glass batches.

The foregoing as well as other objects will be made more apparent as this description proceeds, especially when considered in connection with the accompanying drawings, wherein:

Figure 1 is a front elevation of one type of apparatus constructed in accordance with this invention to produce glass fibers directly from a composite body of the fiber-forming material;

Figure 2 is a diagrammatic vertical sectional view of the apparatus shown in Figure 1 taken substantially along the line 2—2 of Figure 1;

Figure 3 is a diagrammatic view showing a slightly modified apparatus;

Figure 4 is a diagrammatic view showing still another modification of this invention;

Figure 5 is a perspective view of one of the burners shown in Figures 1 and 3; and Figure 6 is a diagrammatic view illustrating a modification of the form of the invention shown in Figure 3.

Referring first to the embodiment of the invention shown in Figures 1 and 2, it will be noted that the reference character 10 indicates a spool suitably supported for rotation about its axis and having a plurality of flexible carrier members 11 wound around the periphery thereof in spaced relation axially of the spool. The carrier members 11 are preferably in the form of threads of a material capable of supporting a dried coating of glass batch material or other thermoplastic substance. The batch material may be any one of several well-known compositions from which glass is normally made or it may be a single silica bearing material such as, for instance, feldspar, which is readily reduced to a glass-like substance by the application of heat. Some other materials from which the carriers or threads may be formed are string, cord, loosely braided sleeving of small diameter, and glass filaments.

The free end portions of the threads are extended from the spool 10 in lateral spaced relation between a pair of driving rolls 12. The driving rolls 12 are suitably supported a substantial distance from the spool 10 for rotation about their respective axes and are driven by any suitable mechanism not shown herein. The arrangement is such that the driving rolls 12 frictionally engage opposite sides of the threads or carriers 11 and cooperate to unwind the latter from the spool 10.

Supported between the spool 10 and driving rolls 12 is a receptacle 13 adapted to contain in fluid form a batch 14 of the material from which it is desired to produce fibers. For the purpose of illustrating this invention, it will be assumed that the batch 14 comprises a thermoplastic material such, for example, as glass in the form of a slurry or batch slip. In this connection, it will be noted that the receptacle 13 is open at the top to enable extending the threads 11 into the batch 14 and is provided with a guide roll 15 below the normal level of the batch. The threads 11 are reeved around the roll 15 and extend upwardly from the roll 15 to a second guide roll 16 to positions above the receptacle 13. From the guide roll 16, the threads 11 are extended downwardly between the cooperating driving rolls 12.

If desired, a suitably heated drier 17 may be positioned in the path of travel of the threads 11 between the receptacle 13 and the driving rolls 12. This drier may be of any approved type and functions to solidify or consolidate the coatings of glass batch previously applied to the threads 11 as the latter pass through the batch 14. The drying action tends to remove the major portion of the water contained in the batch so that steam liberated upon application of melting heat is held to a minimum. It is desirable in this connection to apply as much heat as possible without destroying the carrier.

Supported below the driving rolls 12 at opposite sides of the path of travel of the threads 11 is a pair of burners 18. The burners 18 are identical in construction and accordingly only one burner need be described in detail. As shown in Figure 5, the burner 18 comprises a body 19 of refractory material having a combustion chamber 20 therein. One end of the combustion chamber terminates at a perforated wall 21 having a plurality of small orifices extending therethrough. The other end of the chamber is provided with a wall having a restricted outlet or discharge passage 22 therein. The refractory body may be surrounded by a sheet metal shell 23 which extends past one end of the body to form an inlet chamber 24 between the end of the shell and the perforated wall 21. A suitable pipe 25 connects with the shell to feed the combustible gaseous mixture into the inlet chamber 24.

The type of combustible gas employed may be of any suitable kind, but for reasons of economy, is preferably an ordinary fuel gas such as natural or manufactured fuel gas. This gas is mixed with the proper amount of air by means of the usual types of air and gas mixtures. The gas and air mixture is taken from the mixer at moderate pressure and is led through the pipe 25 to the inlet chamber 24. The gaseous mixture in the inlet chamber 24 passes through the orifices in the wall 21 into the chamber 20 where it is ignited and mixed with a high degree of turbulence.

During operation, the walls of the chamber 20 are heated by the burning gas and the hot walls tend to increase the rate at which the gas mixture entering the chamber burns. The resulting high rate of combustion causes a great expansion of the products of combustion which, as they pass through the outlet passage 22, are accelerated into a very high velocity blast of intense heat. The aim is to feed as much gaseous mixture into the chamber as possible without causing the combustion to become unstable or to take place at the outside of the chamber or to cease entirely.

The outlet passage 22 is substantially less in cross sectional area than the chamber 20, so that the products of the combustion formed within the chamber 20 are accelerated as they pass through the restricted outlet to provide a blast of the gas moving at a high velocity. The cross sectional area of the outlet passage 22 may be varied to some extent relative to the cross sectional area of the chamber 20, depending upon the heat required in the blast leaving the outlet passage 22. Briefly, however, the cross sectional area of the outlet passage 22 is no greater than necessary to obtain in the blast the heat required to raise the glass to the attenuating temperature.

The above type of burner construction results in obtaining an intensely hot, extremely high velocity blast from both the burners 18. As shown in Figure 1, the burners 18 are positioned to direct their respective blasts toward the threads 11 in the general direction of advancement of the threads by the driving rolls 12. The threads 11 are guided into the blast produced by the burners 18 by tubes or channels indicated in Figure 1 by the reference character 30. The number of guides 30 correspond to the number of threads 11 and the guides are suitably supported between the driving rolls 12 and the burners 18.

Referring now to the operation of the embodiment of the invention shown in Figure 1, it will be noted that as the threads 11 pass through the batch slip 14, a certain amount of this material adheres to the threads 11 and is conveyed out of the receptacle 13 by the threads. The coatings of batch thus deposited on the respective threads 11 are dried or consolidated by the drier 17 and the glass coated threads are directed into the blasts of the burners 18 by the guides 30.

In the event the threads 11 are formed of a combustible material such as cotton string or the like, the latter are burned by the blasts and the remaining glass is softened by the intense heat of the blasts. In the event it is desired to expedite burning of the threads by the blast, a combustible material or oxidizing agent, such as sodium nitrate, may be added to the batch or applied directly to the threads before the latter are introduced to the batch. In any case, the softened glass is drawn out by the high velocity hot blasts and is attenuated into extremely fine fibers. On the other hand, if the threads 11 are formed of glass filaments, it will be noted that the filaments are progressively melted or softened as they project into the blasts from the burners 18 and combine with the coating of glass previously applied to form additional fibers under the influence of the blasts.

The embodiment of the invention shown in Figure 3 differs from the first described form of the invention in that the carriers 11 are in the form of continuously heat resistant wires designated in Figure 3 by the reference character 31. The wires 31 are guided in a closed path of travel by guide rolls 32 suitably supported at the places indicated in Figure 3 for rotation.

In this embodiment, it is preferred to substitute a single burner 33 for the two burners 18 previously described and to support the burner 33 at substantially right angles to the path of travel of the wires as they leave the guides 30. As a result, the gaseous blast produced by the burner 33 not only melts the coating of batch on the wires but, in addition, blows the softened glass off of the wires in the form of fibers. Where a metallic carrier is employed it is possible to completely heat treat or calcine the batch carried thereby before it is introduced to the attenuating flame. This process may be carried still further to reduce the batch to glass on the wire if so desired. With the above exceptions, the embodiment shown in Figure 3 operates in the same manner as the construction previously described.

This form of the invention may be modified as illustrated in Figure 6 to the extent that a pool of molten glass 40 may be substituted for the batch receptacle so that as the wire 41 is passed therethrough a coating of glass 42 adheres to the wire. The thickness of the coating may be regulated both by the temperature of the glass and the speed at which the wire is drawn. In this form of the invention it will be understood that the batch drier is unnecessary and is eliminated since the glass upon exposure to the atmosphere readily hardens.

Under these conditions the burner 33 may be placed in close proximity to the receptacle so that heat losses from the glass are held to a minimum. The wire upon entering the body of glass rapidly attains a temperature where it is wet by the glass but this temperature is sufficiently low that the wire in undamaged. Wires suitable for this purpose may be plantinum, Nichrome steel, nickel, or other oxidation resistant metal or alloy.

The glass coating on the wire particularly while still retaining heat from the pool readily attenuates to fibers upon engagement with the high velocity blast of the burner.

The embodiment of the invention shown in Figure 4 illustrates a plurality of receptacles 34 supported in spaced relation to each other along the path of travel of the glass carrier 35. The receptacles 34 are similar to the receptacles 13 in that each contains a body of batch slurry. The carrier 35 is advanced through the receptacles 34 in the same manner previously described and the batch coatings applied to the carrier 35 as it advances through the receptacles are dried or consolidated by a pair of driers 36. The driers 36 are respectively supported at the discharge sides of the receptacles 34 so that the coating of slurry applied to the carrier 35 by the first receptacle is solidified on the carrier before the latter is introduced into the next adjacent receptacle. In this manner, a substantial amount of raw batch may be deposited on the carrier as it is advanced along its path of travel. The above construction may be employed in connection with either of the embodiments shown in Figures 1 and 3 of the drawings.

Various modifications may be resorted to within the spirit of the invention and the scope of the claims.

I claim:

1. The process of making glass fibers which comprises advancing a carrier through a bath of glass forming material of such consistency that it adheres to the carrier as it passes through the bath, drying the material on the carrier, attenuating the dried material to fibers by introducing the coated carrier into a blast having a temperature sufficient to melt the coating on said carrier and having a velocity sufficient to attenuate the material into fine filaments.

2. The process of making glass fibers which comprises advancing a linear member through a pool of glass forming materials sufficiently fluid to adhere to the member as it passes through the pool, attenuating the materials to fibers by engaging the end of the coated member with a blast of the products of combustion discharged from a combustion chamber burner, said blast having a temperature sufficient to reduce said materials to glass on said member and having a velocity sufficient to attenuate the molten glass into fibers.

3. The process of making glass fibers which comprises advancing a linear member through successive pools of glass batch materials of a consistency such that they adhere to the member, drying the batch coatings on said member between successive pools, directing the batch coated member through a heat zone of sufficient temperature to reduce the batch to glass, and simultaneously converting the softened glass coatings into fibers by subjecting the glass to a blast of sufficient velocity to attenuate the softened glass into fine filaments.

4. The process of producing glass fibers which comprises continuously advancing a linear member through successive applications of batches of glass forming materials of a consistency such that they adhere to the member, drying the coatings on said member between successive applications, engaging the coated member with a gaseous blast having a temperature sufficient to reduce the materials to glass on the member and having a velocity sufficient to simultaneously blow the glass off the linear member in the form of fibers.

5. The process of forming glass fibers which comprises advancing a combustible linear member through a batch of glass forming materials of a consistency such that it adheres to the member, drying the materials on the member, and attenuating the dried materials to fibers by directing the batch coated combustible member into a gaseous blast from a combustion chamber burner of sufficient temperature to melt the batch to glass and burn out the member and having sufficient velocity to simultaneously attenuate the melted glass into fine filaments.

6. The process of forming glass fibers which comprises advancing a plurality of threads along a predetermined path of travel, coating the threads with a slurry of glass batch during advancement of the threads along said path of travel, engaging the coated threads with the products of combustion of a gaseous mixture in the form of a blast having a temperature sufficient to burn the threads and reduce the batch to melted glass and having a velocity sufficient to attenuate the melted glass into fibers.

7. The process of making glass fibers comprising advancing a glass filament core member through a slurry of glass batch forming materials of a consistency such that they adhere to the filament as the latter passes through the batch and form therewith a composite body, drying the materials on the core, conveying the batch coated filament through a heat zone having a temperature sufficient to reduce the batch to glass on the filament, and converting the coating and filament into fibers by subjecting the body to a blast from a combustion chamber burner of sufficient temperature and velocity to attenuate the body into fine fibers.

8. Apparatus for producing glass fibers comprising means for continuously advancing a linear core member along a predetermined path of travel, means for depositing a coating of glass batch slurry on said member as it is advanced along said path, means for applying a drying heat to the coating to remove moisture therefrom, and means for directing against said member a gaseous blast having a temperature sufficient to reduce the batch to molten glass and having a velocity sufficient to simultaneously attenuate the molten glass into fibers.

9. Apparatus for producing glass fibers comprising a combustible linear member, means for advancing the linear member through a bath of glass batch slurry to deposit a coating of batch on said member, means for drying the batch on the member, and a burner positioned adjacent the path of travel of the linear member for directing a blast of gaseous medium against said member having a temperature sufficient to melt the batch coating into glass and burn the supporting member and having a velocity sufficient to attenuate the melted glass into fibers.

10. Apparatus for producing glass fibers comprising a plurality of laterally spaced linear members, means for advancing the members successively through a plurality of baths of glass batch slurry to deposit coatings of batch on said members, means between adjacent glass batches for drying the coating applied to the members by the preceding batch, and a burner positioned adjacent the path of travel of the coated linear members for directing a blast of gaseous medium against said members having a temperature sufficient to reduce the batches to glass on the members and having a velocity sufficient to blow the glass from the members in the form of fibers.

11. Apparatus for producing glass fibers comprising means for advancing a heat resisting linear member along a predetermined path of travel, means for initially coating the member with molten glass as it is advanced along said path, and a burner positioned adjacent the path of travel of the linear member having a chamber in which a combustible gaseous mixture is ignited and having a restricted discharge passage directed toward said member for discharging a blast against said member having a temperature sufficient to heat the glass on the member to attenuating temperature and having a velocity sufficient to blow the glass off the member in the form of fine fibers.

12. The process of making fibers which comprises continuously leading a linear carrier through a bath of potentially fiber producing material in a substantially fluid state to coat the carrier and form a composite body, consolidating the composite body by applying heat thereto, and attenuating fibers therefrom by advancing the composite body through a high velocity, high temperature gaseous blast of a combustion chamber burner.

13. The process of making glass fibers which comprises continuously leading a linear carrier through a bath of glass forming materials in a substantially fluid state to coat the carrier and form a composite body, heating the composite body for a time and at a temperature sufficient to consolidate the material, and attenuating the composite body to fibers by directing the body into the high temperature high velocity blast of the burner of a combustion chamber burner.

FAY V. TOOLEY.

REFERENCES CITED

The following references are of record in the file of this patent:

UNITED STATES PATENTS

| Number | Name | Date |
|---|---|---|
| 2,165,031 | Brace | July 4, 1939 |
| 2,171,006 | Morgan et al. | Aug. 29, 1939 |
| 2,187,094 | Pink | Jan. 16, 1940 |
| 2,269,459 | Kleist | Jan. 13, 1942 |
| 2,371,213 | Batchell | Mar. 13, 1945 |

FOREIGN PATENTS

| Number | Country | Date |
|---|---|---|
| 533,835 | Great Britain | Feb. 20, 1941 |